May 5, 1931. A. L. LOSSIE 1,803,630
EDUCATIONAL CHART
Filed Oct. 25, 1928 2 Sheets-Sheet 1
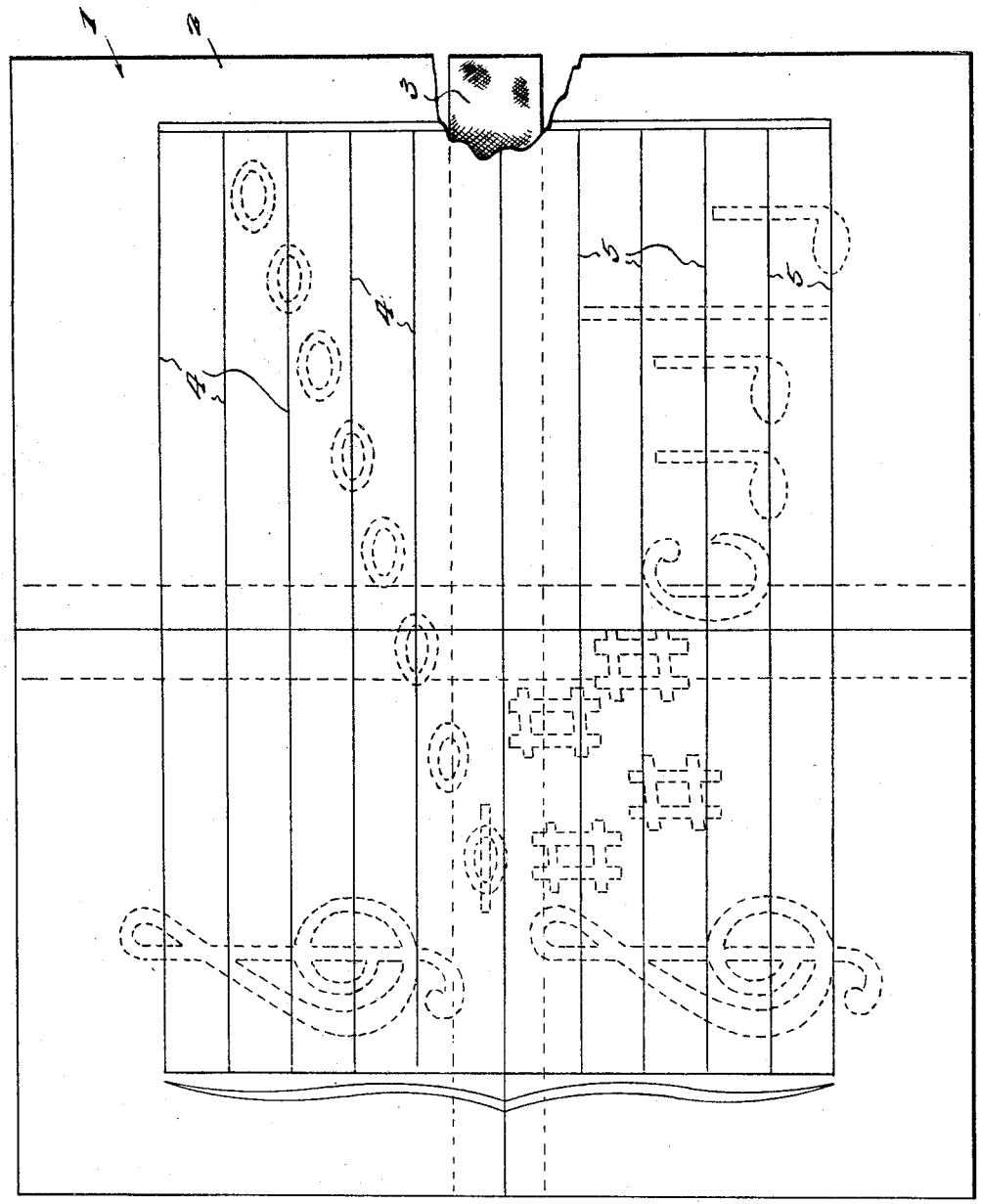

May 5, 1931. A. L. LOSSIE 1,803,630
EDUCATIONAL CHART
Filed Oct. 25, 1928 2 Sheets-Sheet 2
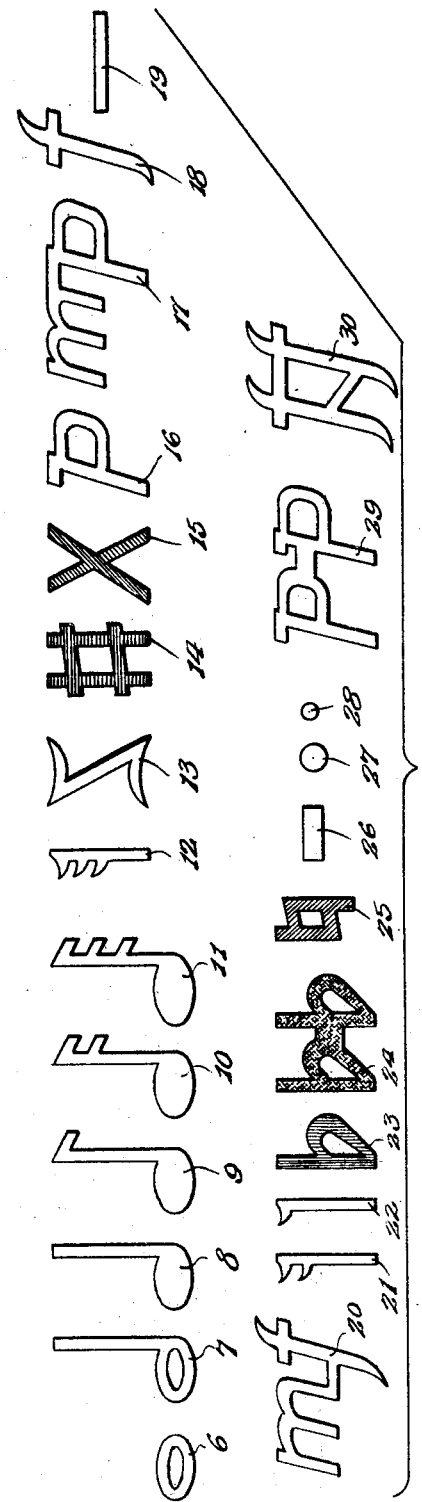
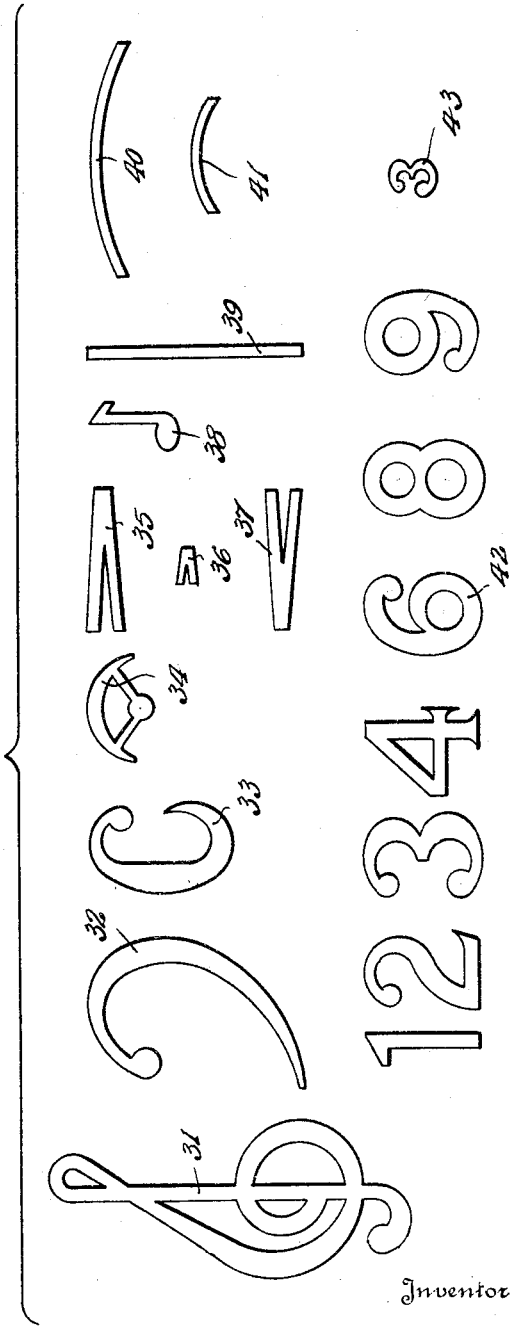
Inventor
A. L. Lossie.
By Lacey & Lacey, Attorneys Patented May 5, 1931

1,803,630

UNITED STATES PATENT OFFICE

ALBERTA LOUISE LOSSIE, OF LOUISVILLE, KENTUCKY

EDUCATIONAL CHART

Application filed October 25, 1928. Serial No. 315,009.

This invention relates to improvements in educational charts and more particularly to a chart for employment in teaching pupils the art of musical notation and composition.

It is a well recognized fact that where educational charts or other appliances are employed in instructing young pupils, the best results will be obtained if the chart or other appliance is of a nature to attract and hold the attention of the pupil and inspire him with an interest in the subject being taught. Therefore, it is one of the important objects of the present invention to provide a chart, the employment of which will arouse the pupil's interest in the subject being taught and which will enable the instructor to present the subject in a more attractive manner than by the mere writing of the musical notation or composition and which chart will, therefore, present the advantages outlined.

As a general rule, musical charts of this class such as have heretofore been proposed for use, have been expensive to maufacture and are, therefore, designed primarily for employment by the instructor rather than by the individual pupil. It is, therefore, another important object of the invention to provide a musical educational chart which will be extremely simple in its construction and so economical to manufacture that individual pupils may be furnished with the same or may purchase the same at a low cost, thereby enabling each pupil of a class to employ an individual chart. In this respect, the invention presents the further advantage that, even where a large class is being instructed, the teacher or instructor, passing around the class or standing at a point of vantage where he or she may observe, at will, all or substantially all of the charts in the class, may take note of the errors being made during the period of instruction, and thereby give individual pupils individual instruction, from time to time, as occasion may require.

Another object of the invention is to so construct the chart that when an error is made by any pupil, the same may be readily rectified by a simple manipulation of the musical symbols which are employed in connection with the chart proper.

Another object of the invention is to so construct the chart that more technical compositions may be displayed thereon as well as simple scales and other simple musical notations.

Another object of the invention is to provide means whereby the face of the chart may be divided into any desired number of measures, the distance between the bars of which may be varied so as to accommodate the notes and other symbols which comprise any particular measure.

Still another object of the invention is to provide a chart which may be folded to assume a compact form and which when unfolded for use, will present a flat, smooth surface over which the musical symbols may be conveniently moved and suitably arranged.

In the accompanying drawings:

Figure 1 is a plan view of the chart proper, a portion of the chart being broken away to illustrate the means provided for the folding of the chart, the said figure illustrating, in dotted lines, one of the innumerable arrangements of musical symbols which may be effected.

Figure 2 is a group view illustrating the various musical symbols which are employed in connection with the chart proper.

The chart is indicated in the drawings in general by the numeral 1 and the same preferably comprises four sections indicated by the numeral 2 which are of rectangular form and preferably of hard-finished, smooth-surfaced fibrous material which material is sanitary to use and due to its smooth finish, permits of movement over the chart of the various symbols which will presently be more specifically referred to. Strips 3 are employed in connecting the several sections 2 of the chart and, at the time of manufacture, the sections 2 are arranged with their edges mutually contacting as shown in Figure 1, and the strips 3, which are of cloth or the like, are secured by adhesive to the under or rear face of the chart longitudinally of meeting edges of the several sections. It will be understood at this point that when the chart is laid flat upon a table, it will assume a flat form so that its upper surface will be smooth and substantially unbroken, whereas, when it is desired to temporarily discontinue the use of the chart, the several sections may be folded together, the strips 3 at such time acting in the manner of a hinge.

Printed upon the face of the chart are upper and lower staffs, the lines of the upper staff being indicated by the numeral 4 and the lines of the lower staff being indicated by the numeral 5.

The invention embodies a plurality of musical symbols which are preferably stamped or cut from fiber board and which are intended to be selectively disposed and arranged upon the staffs of the chart 1, and these symbols are illustrated in Figure 2 of the drawing, and in the said figure the numerals 6, 7, 8, 9, 10 and 11 indicate, respectively, whole, half, quarter, eighth, sixteenth and thirty-second notes, all of which are black in color or given a black finish. The numerals 12 and 13 indicate respectively a thirty-second rest and a quarter rest, and the numerals 14 and 15 respectively indicate a sharp and a double sharp. The rests 12 and 13 are preferably finished in black, as in the case of the notes, and the sharp 14 is preferably blue in color and the double sharp 15 preferably purple in color. The numeral 16 indicates a symbol denoting soft tone, the numeral 17 indicates a symbol denoting moderately soft, and the numeral 18 indicates a symbol denoting loud tone. The numeral 19 indicates a symbol denoting an added line which may be arranged above or below either of the staffs upon the face of the chart. The numeral 20 indicates the usual symbol denoting moderately loud tone. The numerals 21 and 22 indicate symbols denoting a sixteenth rest and an eighth rest. The numerals 23, 24 and 25 indicate respectively, symbols denoting a flat, a double flat, and a natural, and these symbols are preferably colored respectively red, orange and green. With these three exceptions and the two previously indicated exceptions, the symbols are all black. The numerals 26, 27 and 28 indicate respectively symbols denoting a whole and half rest, a large dot and a small dot, and the numerals 29 and 30 indicate symbols denoting very soft tone and very strong tone, respectively.

The symbols representing a treble clef and a base clef, are indicated respectively by the numerals 31 and 32, and the numeral 33 indicates a symbol representing common measure. The numeral 34 indicates a symbol which denotes hold. The symbols denoting diminuendo, accent, and crescendo, are indicated respectively by the numerals 35, 36, and 37, the numeral 38 indicating a grace note, and the numeral 39 indicating a bar. The numerals 40 and 41 indicate respectively a large slur and a small slur.

A number of symbols indicated in general by the numeral 42 and representing the ordinals 1, 2, 3, 4, 6, 8, and 9, are also provided and are to be employed in arranging the meter or time signature, and there is also provided a small symbol 43 representing a triplet.

Any desired number of each of the symbols 6 to 43 inclusive may be provided and it will be understood that the various symbols are to be disposed upon the face of the chart and adjusted to assume different positions with relation to the lines and spaces of the staff or staffs, so as to graphically represent one or a plurality of musical measures. It will be evident that the symbols may be readily disposed upon the face of the chart and positioned by slidably adjusting them over the said face of the chart.

Preferably, the staff will be colored yellow, and the flats, sharps, double flats, double sharps, and natural, will be colored as previously stated.

It will be understood that what is shown in the drawings is merely illustrative of one embodiment of the invention and that the size, proportions, and other characteristics of the component parts of the device may be changed or modified without departing from the spirit of the invention.

Having thus described the invention, what I claim is:

An educational device comprising a board having a representation of a staff and consisting of a plurality of flat sections of rectangular form disposed in edge to edge contact with one another, flexible strips adhering to the rear faces of the sections in bridging relation to the contacting edges thereof whereby to connect the sections and permit the chart to be folded into a compact mass, and a plurality of music symbols disposable upon the front face of the board and freely movable thereon into determined positions thereon relative to the staff.

In testimony whereof I affix my signature.

ALBERTA LOUISE LOSSIE. [L. S.]